United States Patent
Li et al.

(10) Patent No.: US 9,860,758 B2
(45) Date of Patent: Jan. 2, 2018

(54) SYSTEMS AND METHODS FOR PLACING VIRTUAL SERVING GATEWAYS FOR MOBILITY MANAGEMENT

(71) Applicants: Xu Li, Ottawa (CA); Ngoc-Dung Dao, Ottawa (CA); Hang Zhang, Ottawa (CA)

(72) Inventors: Xu Li, Ottawa (CA); Ngoc-Dung Dao, Ottawa (CA); Hang Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/243,486

(22) Filed: Aug. 22, 2016

(65) Prior Publication Data

US 2016/0373936 A1   Dec. 22, 2016

Related U.S. Application Data

(63) Continuation of application No. 14/561,805, filed on Dec. 5, 2014, now Pat. No. 9,445,279.

(51) Int. Cl.
*H04L 5/00* (2006.01)
*H04W 16/18* (2009.01)
*H04W 88/16* (2009.01)

(52) U.S. Cl.
CPC .......... *H04W 16/18* (2013.01); *H04W 88/16* (2013.01)

(58) Field of Classification Search
None
See application file for complete search history.

(56) References Cited

U.S. PATENT DOCUMENTS

| 2007/0268858 A1 | 11/2007 | Soto |
| 2013/0121207 A1 | 5/2013 | Parker |
| 2014/0092765 A1 | 4/2014 | Agarwal et al. |

(Continued)

FOREIGN PATENT DOCUMENTS

| CN | 102711079 A | 10/2012 |
| CN | 102883377 A | 1/2013 |

(Continued)

OTHER PUBLICATIONS

PCT International Search Report and Written Opinion, PCT/CN2015/095885, Mar. 2, 2016, 11 pages.

(Continued)

*Primary Examiner* — Jay P Patel

(57) ABSTRACT

Methods and systems for determining placement of a virtual serving gateway. The method includes obtaining a set of input information. The input information includes network information and configuration information providing one or more parameters for placing the virtual serving gateway, and includes at least one mobility insensitivity criterion. Placement of the virtual serving gateway at one or more physical hosts is determined in accordance with the network information and the configuration information. The virtual serving gateway is distributively placeable across physical hosts. A set of output information is generated. The output information includes information identifying placement of the virtual serving gateway at the physical hosts, and a hosting percentage for each physical host.

28 Claims, 7 Drawing Sheets

(56) References Cited

U.S. PATENT DOCUMENTS

| | | | |
|---|---|---|---|
| 2015/0074793 A1* | 3/2015 | Dalvi | H04L 63/0272 |
| | | | 726/15 |
| 2015/0365217 A1 | 12/2015 | Scholten et al. | |
| 2015/0370586 A1 | 12/2015 | Cooper et al. | |
| 2015/0372869 A1* | 12/2015 | Rao | H04L 61/103 |
| | | | 709/224 |
| 2016/0099860 A1* | 4/2016 | Huang | H04L 45/70 |
| | | | 370/389 |
| 2016/0157043 A1* | 6/2016 | Li | H04L 41/12 |
| | | | 370/254 |

FOREIGN PATENT DOCUMENTS

| | | |
|---|---|---|
| WO | 2011094125 A1 | 8/2011 |
| WO | 2013187054 A1 | 12/2013 |

OTHER PUBLICATIONS

Office Action for corresponding Korean Patent Application No. 10-2017-7017684 dated Oct. 20, 2017.

\* cited by examiner

SYSTEMS AND METHODS FOR PLACING VIRTUAL SERVING GATEWAYS FOR MOBILITY MANAGEMENT

CROSS REFERENCE TO RELATED APPLICATIONS

The present disclosure is a continuation of U.S. patent application Ser. No. 14/561,805, filed Dec. 5, 2014, the entirety of which is hereby incorporated by reference.

FIELD

The present disclosure relates to mobile networks. In particular, the present disclosure relates to systems and methods for placing virtual serving gateways in a virtual network for mobility management.

BACKGROUND

In a wireless network, the geographical location of wireless user equipment (UE) may change over time. The physical path travelled by the UE over time may correspond to changes in the network links used by the UE, for example from one access point to another access point. The path travelled by the UE may also correspond to variations in link quality, for example as the UE enters and exits a tunnel or a building. This means that data to and from the UE must be sent on a logical path through the network that is dynamic and potentially unstable. This can result in complications for traffic engineering.

SUMMARY

In some examples, the present disclosure provides a method for determining placement of a virtual serving gateway. The method may include obtaining a set of input information. The input information may include network information providing information about a physical network for mobile communications by a mobile device; and configuration information providing one or more parameters for placing the virtual serving gateway, including at least one mobility insensitivity criterion. The method may also include determining placement of the virtual serving gateway at one or more physical hosts in the physical network in accordance with the network information and the configuration information. The virtual serving gateway may be distributively placeable across one or more physical hosts. A set of output information may be generated, including: information identifying placement of the virtual serving gateway at the one or more physical hosts; and a respective hosting percentage for each physical host.

In some examples, the present disclosure provides a system for placing a virtual serving gateway. The system may include a processing device configured to cause the system to obtain a set of input information. The input information may include network information providing information about a physical network for mobile communications by a mobile device; and configuration information providing one or more parameters for placing the virtual serving gateway, including at least one mobility insensitivity criterion. The system may also be caused to determine placement of the virtual serving gateway at one or more physical hosts in the physical network in accordance with the network information and the configuration information. The virtual serving gateway may be distributively placeable across one or more physical hosts. A set of output information may be generated, including: information identifying placement of the virtual serving gateway at the one or more physical hosts; and a respective hosting percentage for each physical host.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
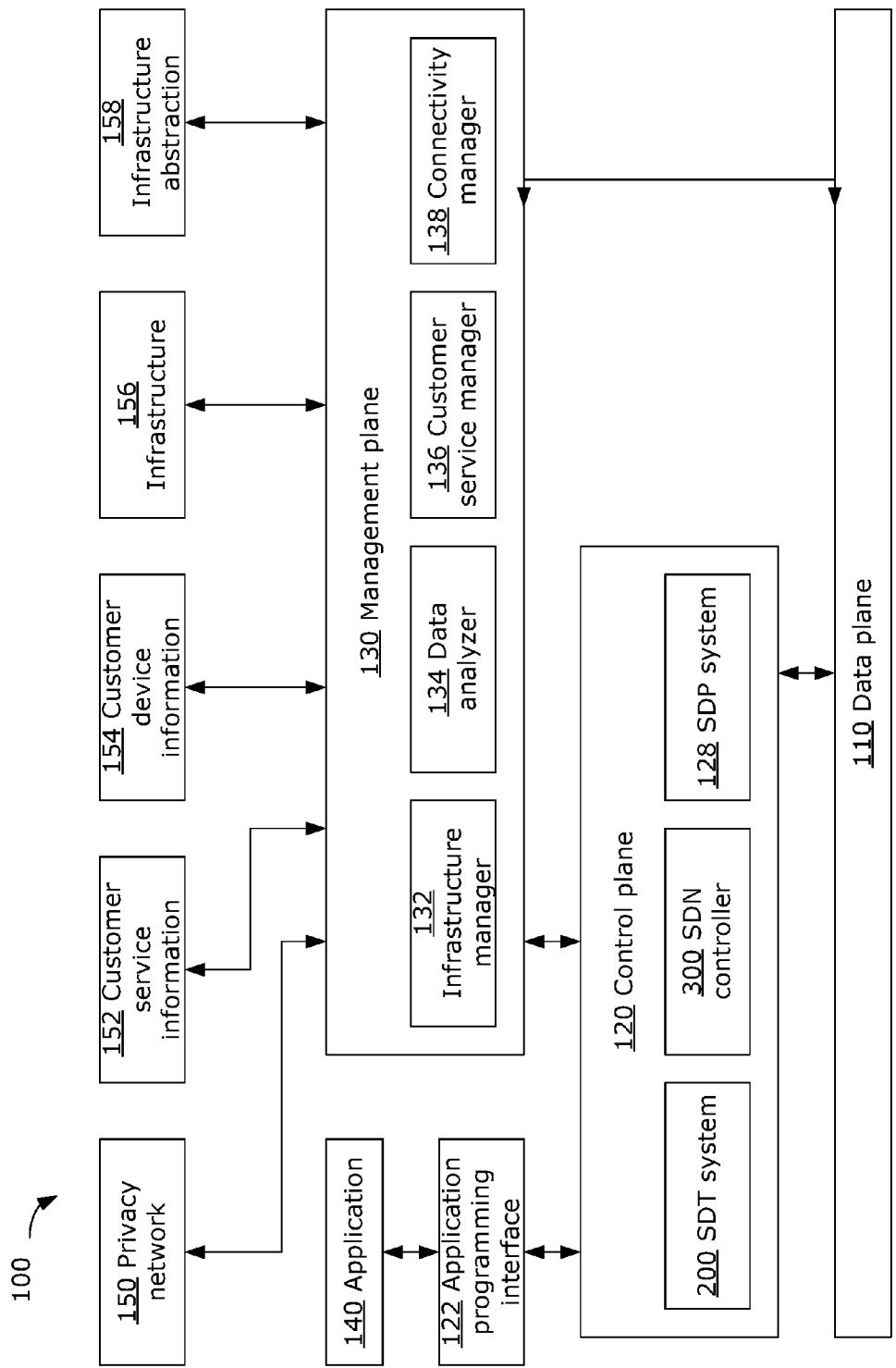
FIG. 1 is a schematic diagram of an example logical architecture for a network.

Software-defined networking (SDN) is an architectural framework for creating intelligent programmable networks, where network traffic management and network traffic forwarding are separated into the control plane and the data plane, respectively. In SDN, network control is centralized and the underlying network infrastructure is abstracted from the application.

A software-defined topology (SDT) may be formed, in accordance with the present disclosure for example, and the SDT may be used with SDN and software-defined protocol (SDP) to create a virtual network (VN). Network traffic may be managed at a controller in the control plane over the VN, without requiring the controller to directly manage the physical nodes of the network. A VN may be a per-user network, meaning that the VN may be a collection of resources virtualized to service a particular user (e.g., a particular user equipment (UE) or non-mobile terminal). The SDT may be formed based on customer information and provider information. Customers may include users of one or more services (e.g., via the UE or terminal). Providers may include service providers, VN operators, and/or other providers of services over the network.

In the SDN control plane, one or more SDN controllers may manage network resources and control network traffic globally. For simplicity, the present disclosure will refer to the SDN controller in the singular, however it should be understood that there may be more than one SDN controller in accordance with some examples of the present disclosure. The SDN controller may solve a traffic engineering (TE) problem based on the status information of individual network elements and overall traffic requirements. Generally, TE may jointly determine for each traffic flow the routing paths and resource allocation (also referred to as traffic splitting) along the paths with respect to the quality of service (QoS) requirements (e.g., rate demand) of individual flows and with respect to resource constraints (e.g., link capacity) so that a network utility is maximized and satisfactory quality of experience (QoE) is delivered to users. The SDN controller provides control instructions to data plane hardware for optimizing the operation of the entire network, using a suitable inter-plane communication mechanism. In the data plane, flows are then split among their routing paths following the instructions.

Due to network and traffic dynamics, TE may be carried out at time intervals, and its solution typically exhibits dynamics, such as routing dynamics and splitting dynamics. In cases where flow paths are predetermined, TE optimization may be reduced to resource allocation among flow paths. In this case, routing dynamics may be due to mobility of UEs, while splitting dynamics may result from routing dynamics and traffic distribution in the network.

UE mobility over the VN may present challenges for TE. For a highly mobile UE, the data path for routing data from a data source to the UE may be highly time-varying and may result in unstable TE. Unstable TE that is highly sensitive to UE mobility may consume a significant portion of resources (e.g., requiring large control overhead) and/or result in degraded system performance.

Approaches to mobility management include centralized mobility management (CMM) and distributed mobility management (DMM). In CMM, mobility management functions are typically co-located in a core network node. However, this may result in overloading of the core network node and/or inefficient routing of traffic. In DMM, different network nodes are typically set up as gateways to handle different mobility functions, which may help to address some of the issues of CMM. However, there remains a need to determine how to locate the gateways at physical network nodes for data forwarding and processing. For example, different network nodes may have different cached contents and/or different data processing capabilities, which may make the network nodes more or less preferred for hosting a gateway. In various examples, the present disclosure enables placement of virtual serving gateways at physical hosts, while taking into account the data routing potential and data processing capabilities of the physical hosts.

To assist in understanding the present disclosure, reference is first made to FIG. 1, showing an example logical architecture 100 for a network which may be used for communications with a mobile UE. The example architecture 100 may be used to implement SDN, using a SDT. The SDT may cooperate with SDN to facilitate traffic control and/or traffic processing, by defining virtual serving gateways via which data are routed to and from the UE, and by providing a virtual topology, as discussed further below.

Generally, a SDT may provide a framework for software-defined content delivery that may allow operators to define on-demand and service specific data plane architecture (also referred to as network topology or logical topology) to help enable more efficient use of network resources and/or help ensure quality of experience (QoE) and/or quality of service (QoS) to users. The SDT may, for each application, service or per-user VN, determine an on-demand and customized data plane topology. The SDT may define the physical locations of logical network nodes for the logical data plane, as well as the topology of the nodes in the data plane topology. The SDT may also define service-specific or user-specific data processing functionalities for logical nodes in the data plane logical topology.

Generally, a logical node may be a software-defined entity implemented at a physical network node (also referred to as the physical host for the logical node), may perform various functions and may take on various roles within the network. For example, a logical node may be a service-specific virtual serving gateway (v-s-SGW), a user-specific virtual serving gateway (v-u-SGW), or a content container, among other possible roles.

The SDT typically determines the data plane logical topology for each application, service, or per-user VN, based on requirements such as QoE and/or QoS. The SDT may also determine the data plane logical topology according to the service level logical topology, service-function chain requirements, service traffic characteristics, customer distribution, mobility speed prediction, and/or traffic load predictions, among other parameters. The SDT may be adaptive to feedback from the SDN controller, as discussed further below, to enable adaptation to changes in traffic load, network node capabilities, and/or changes in the physical network, for example. The SDT may be managed by network providers, VN providers or other operators.

FIG. 1 shows the example network architecture 100 separating an example network (e.g., a mobile network) into a data plane 110, a control plane 120 and a management plane 130. The data plane 110 may transport network traffic among various network nodes and UEs (e.g., UEs to access points, access points to routers, and access points/routers to servers). The control plane 120 may perform TE and may transport control signals among the various network nodes. The management plane 130 may provide management and administrative functionalities for the network. The data plane 110, the control plane 120 and the management plane 130 may interface with each other, to enable the functionalities of each plane.

The control plane 120 may provide an application programming interface (API) 122 to allow one or more applications 140 to access the control plane 120. The control plane 120 may host various control blocks, such as a SDT system 200 and SDN controller 300, and a SDP system 128, to carry out the functionalities of the control plane 120. The SDT system 200, SDN controller 300 and SDP system 128 may be implemented in one or more shared or separate processing systems.

The management plane 130 may host various control blocks (e.g., software modules) to carry out its functionalities. For example, the management plane 130 may implement an infrastructure manager 132, a data analyzer 134, a customer service manager 136 and/or a connectivity manager 138. Other functionalities may be provided by the management plane 130, such as content service management, which may define content caches in a radio access network (RAN), may configure cache-capable network nodes, and may manage content forwarding.

The management plane 130 may access one or more databases, which may be included in the architecture 100, to carry out its functionalities. Example databases include a privacy network database 150, a customer service information database 152, a customer device information database 154, an infrastructure database 156 and an infrastructure abstraction database 158. The privacy network database 150 may store topology information, security information, information about node capabilities and/or information about node states. The customer service information database 152 may store authentication and security information related to customer devices (e.g., UEs). The customer device information database 154 may store information about capabilities, locations and/or states of customer devices. The infrastructure database 156 may store information about network topology, node capabilities and/or node states. The infrastructure abstraction database 158 may store information about various infrastructure abstractions within the network. There may be more or fewer databases than those described in this example, and one or more of these example databases may be combined as a single database.

Figure 2:
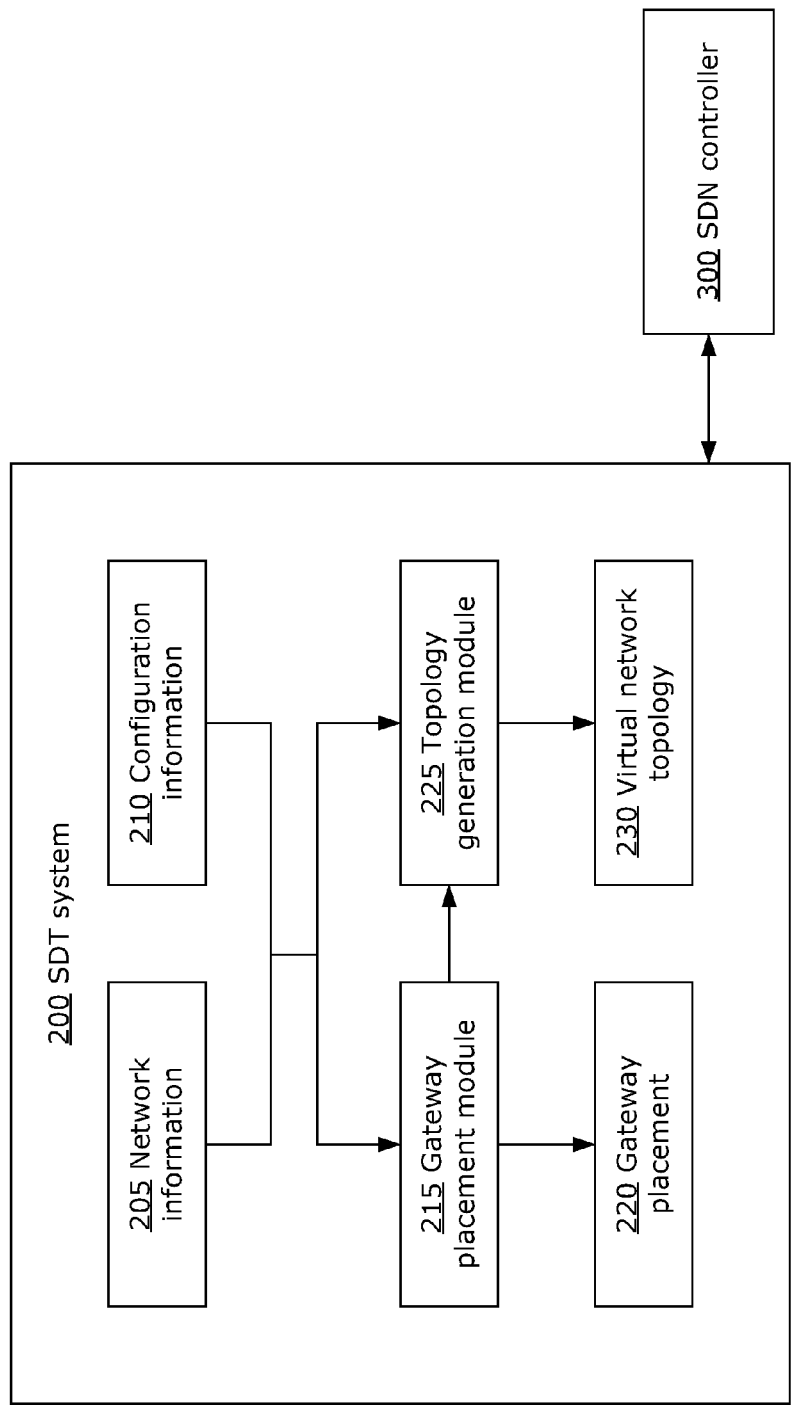
FIG. 2 is a schematic diagram of an example software-defined topology system, in communication with a software-defined network controller.

FIG. 2 is a schematic diagram of an example system for placing virtual serving gateways and generating a logical topology for mobility management over a VN. The system may be the SDT system 200. The SDT system 200 may generally be responsible for customizing the logical data plane topology for the VN. In the present disclosure, the logical data plane topology for the VN will be generally referred to as the VN topology. The SDT system 200 may communicate with one or more network control components, such as the SDN controller 300 and the SDP system 128. The SDT system 200 may cooperate with the SDN controller 300 to facilitate traffic control and processing, for example as disclosed herein.

The SDT system 200 may store information used to determine placement of virtual serving gateways and generate a VN topology. In the example shown, the SDT system 200 stores network information and configuration information in respective network information database 205 and configuration information database 210. This information may be stored in a memory of the SDT system 200, for example, as discussed further below with respect to FIG. 4. The network information database 205 may include information about the physical network (e.g., UE identification and properties, UE traffic, network node properties, and/or virtual serving gateway candidates), discussed further below. The configuration information database 210 may include parameters used for placing virtual serving gateways and for generating a VN topology, such as cost measures, mobility sensitivity requirements and scope of interest, as discussed further below. The network information and the configuration information may be received as input from one or more external sources (e.g., from the SDN controller 300 or from an operator). In some examples, the network information and/or the configuration information may not be stored by the SDT system 200, but may instead be received or retrieved from an external source (e.g., one or more external databases) and may be discarded after use, in which case the network information database 205 and/or the configuration information database 210 may be omitted from the SDT system 200. In some examples, the network information database 205 and the configuration information database 210 may be replaced by a single database of input information, or with other database(s).

A gateway placement module 215 may obtain network information and configuration information (e.g., from the network information database 205 and the configuration information database 210, or from an external source such as the SDN controller 300) as input to place one or more virtual serving gateways at one or more physical hosts. The gateway placement module 215 may determine placement of the virtual serving gateway(s) using an optimization process, such as in the example described below. Although the term "optimization" is used, it should be understood that this refers to a process in which the virtual serving gateway(s) is(are) placed at physical host(s) to meet certain criteria (e.g., as specified in the configuration information), and may not be strictly "optimal". For example, there may be trade-offs and/or estimation involved, and some criteria may be prioritized over other criteria (e.g., based on selection by an operator).

The gateway placement module 215 may output information defining placement of the virtual serving gateway(s) at one or more physical hosts, which information may be stored in a gateway placement database 220 in a memory of the SDT system 200. The gateway placement information may include, for example, selection of physical hosts for virtual serving gateways and share of gateway traffic per physical host.

A topology generation module 225 may obtain network information and configuration information (e.g., from the network information database 205 and the configuration information database 210, or from an external source such as the SDN controller 300), as well as the determined placement of virtual serving gateway(s) (e.g., from the gateway placement module 215 or from the gateway placement database 220) as input to generate a VN topology. The topology generation module 225 may generate a VN topology using a suitable optimization process.

The topology generation module 225 may output information about the generated VN topology, which information may be stored in a VN topology database 230 in a memory of the SDT system 200. The VN topology information may include, for example a network hierarchy (in examples where a hierarchical topology is used) and/or links between logical nodes at the same level (e.g., for a mesh topology).

The SDT system 200 may provide the VN topology information and the gateway placement information to the SDN controller 300, through wired or wireless communication.

In some examples, the gateway placement database 220 may be omitted, such as where the gateway placement module 215 provides output directly to the topology generation module 225 and to the SDN controller 300, without storing the gateway placement information within the SDT system 200. Instead, the gateway placement information may be discarded after use, or may be stored externally to the SDT system 200 (e.g., within the SDN controller 300 or in another external database).

In some examples, the VN topology database 230 may be omitted, such as where the topology generation module 225 provides output directly to the SDN controller 300, without storing the VN topology information within the SDT system 200. Instead, the VN topology information may be stored externally to the SDT system 200 (e.g., within the SDN controller 300 or in another external database).

In some examples, the SDT system 200 may also determine one or more functionalities to be provided by one or more virtual serving gateways (e.g., where there are no service restrictions at the physical host(s) of the virtual serving gateway(s)). The SDT system 200 may provide output information that defines functionality(ies) for specific virtual serving gateway(s) at specific physical host(s) to the SDP system 128. The SDP system 128 may then interact with hardware in the data plane 110 to install/uninstall or otherwise enable/disable the defined functionality(ies) at the specified physical host(s). This may enable customizable or application-defined virtual serving gateway functionalities. For example, application-defined functionalities may include network coding function (e.g., fountain coding function), and video transcoding function in the case of video traffic.

The SDT system 200 may be physically hosted by one or more servers of the control plane 120.

Figure 3:
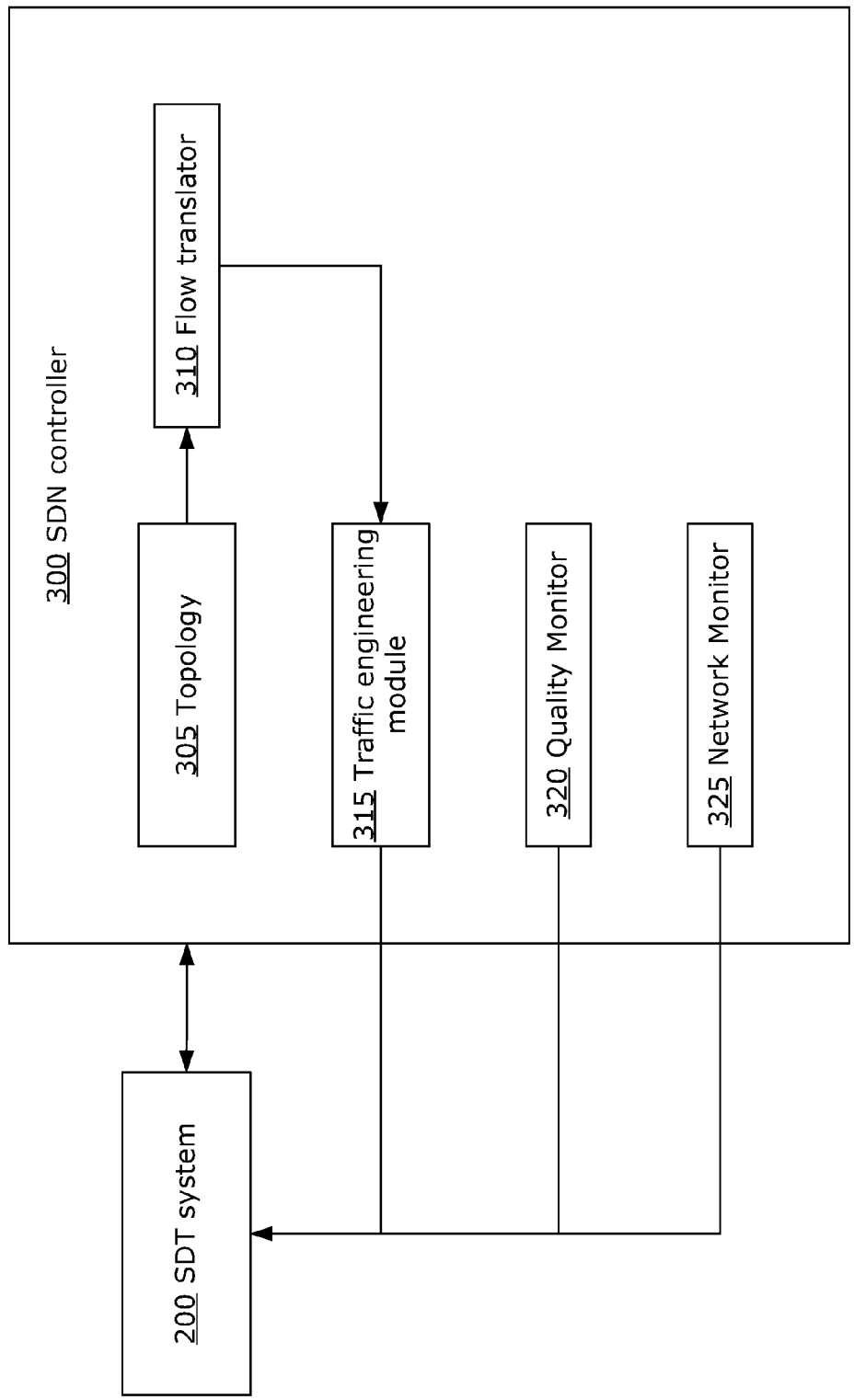
FIG. 3 is a schematic diagram of an example software-defined network controller, in communication with a software-defined topology system.

FIG. 3 is a schematic diagram of an example SDN controller 300. The SDN controller may generally be responsible for customized resource allocation. The SDN controller 300 may cooperate with the SDT system 200 to facilitate traffic control and processing. For example, the SDN controller 300 may provide feedback to the SDT system 200, such as requests to update or change the VN topology.

The SDN controller 300 may receive information from the SDT system 200 defining a VN topology (e.g., including information defining placement of virtual serving gateway(s) at physical host(s) and links between virtual serving gateway(s)), and may store the topology information in a topology database 305 in a memory of the SDN controller 300. The VN topology information may be provided to a flow translator 310, which may translate the VN topology into individual flow segments for the purpose of TE. For example, a path through several levels of a hierarchical topology may be translated by the flow translator 310 into individual flow segments corresponding to each level. The flow segments from the flow translator 310 may be provided to a TE module 315 for traffic management. The TE module 315 may perform traffic management on the flow segments according to various suitable TE techniques. The SDN controller 300 may implement a quality monitor 320 which may monitor the network traffic for QoE and/or QoS. The SDN controller 300 may also implement a network monitor 325 which may monitor the network for network events, such as a significant change in the data plane topology (e.g., addition/removal of a physical node, change in physical connectivity between network nodes), a significant change in the traffic flow, or other such network events.

The SDN controller 300 may provide feedback to the SDT system 200. For example, the SDN controller 300 may, through the TE module 315, the quality monitor 320 and/or the network monitor 325, request the SDT system 200 to update, change or otherwise generate a new VN topology. For example, the SDN controller 300 may request a new topology from the SDT system 200 when a significant change in the physical network is detected (e.g., as detected by the network monitor 325), when a significant change in traffic flow is detected (e.g., as detected by the network monitor 325), or when QoE and/or QoS falls below a certain threshold (e.g., as detected by the quality monitor 320).

Figure 4:
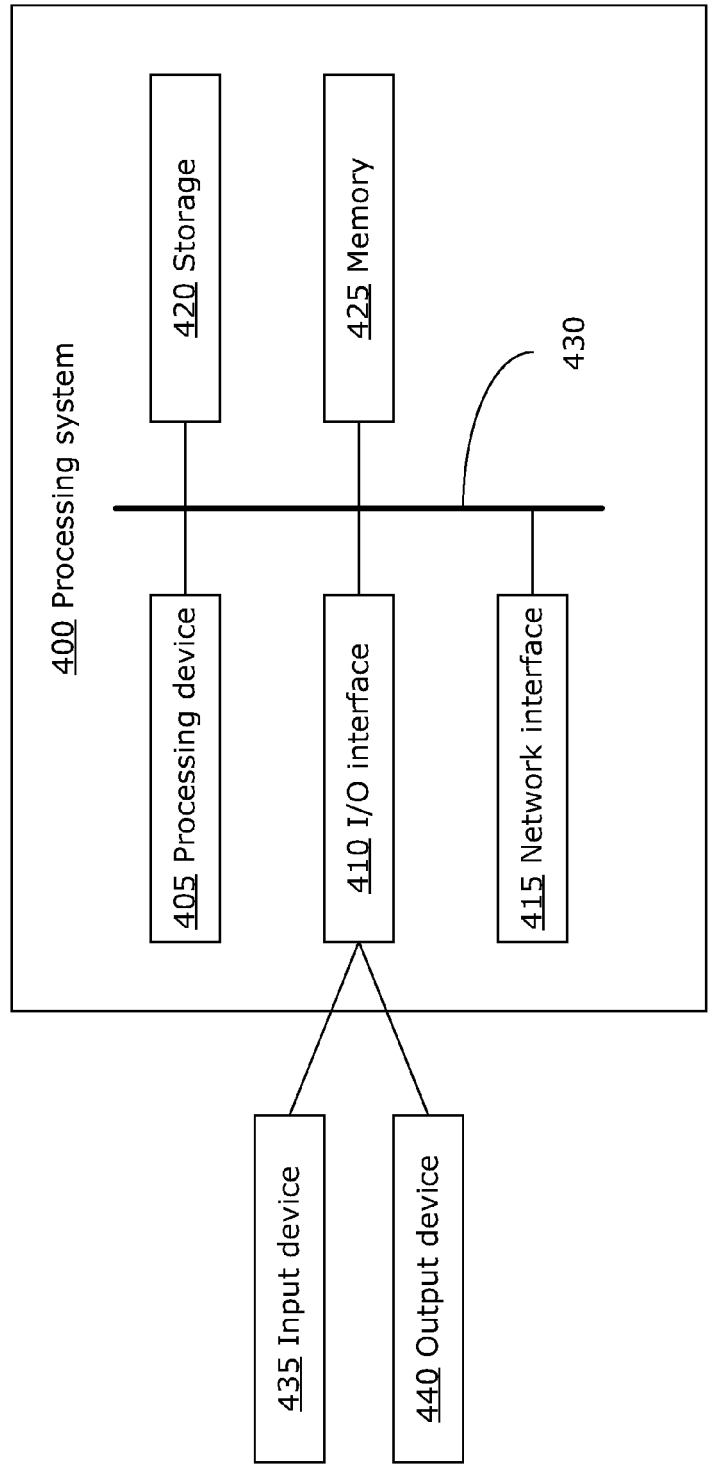
FIG. 4 is a schematic diagram of an example computing system suitable for implementing the present disclosure.

FIG. 4 is a schematic diagram of an example processing system 400, which may be used to implement the methods and systems disclosed herein, such as the example SDT system 200, the example SDN controller 300, and the example methods described below. The SDT system 200 and the SDN controller 300 may be implemented on shared or separate processing systems 400. In some examples, the SDT system 200 and/or the SDN controller 300 may be implemented by a plurality of processing systems working in parallel. The processing system 400 may be a server, for example, or any suitable computing system. Other processing systems suitable for implementing the present disclosure may be used, which may include components different from those discussed below. Although FIG. 4 shows a single instance of each component, there may be multiple instances of each component in the processing system 400.

The processing system 400 may include one or more processing devices 405, such as a processor, a microprocessor, an application-specific integrated circuit (ASIC), a field-programmable gate array (FPGA), a dedicated logic circuitry, or combinations thereof. The processing system 400 may also include one or more input/output (I/O) interfaces 410, which may enable interfacing with one or more appropriate input devices 435 and/or output devices 440. The processing system 400 may include one or more network interfaces 415 for wired or wireless communication with a network (e.g., an intranet, the Internet, a P2P network, a WAN and/or a LAN). The network interface(s) 415 may include wired links (e.g., Ethernet cable) and/or wireless links for intra-network and/or inter-network communications. The network interface(s) 415 may provide wireless communication via one or more transmitters or transmit antennas and one or more receivers or receive antennas, for example. The processing system 400 may also include one or more storage units 420, which may include a mass storage unit such as a solid state drive, a hard disk drive, a magnetic disk drive and/or an optical disk drive.

The processing system 400 may include one or more memories 425, which may include a volatile or non-volatile memory (e.g., a flash memory, a random access memory (RAM), and/or a read-only memory (ROM)). The non-transitory memory(ies) 425 may store instructions for execution by the processing device(s) 405, to carry out the functions of the SDT system 200 and/or the SDN controller 300. Depending on whether the processing system 400 implements the SDT system 200 or the SDN controller 300 or both, the memory(ies) 425 may have tangibly stored thereon data and module(s) for implementing the functions of the SDT system 200 or the SDN controller 300 or both, as appropriate. For example, the memory(ies) 425 may include the network information database 205, the configuration information database 210, the gateway placement database 220 and/or the VN topology database 230, and modules such as the gateway placement module 215 and/or the topology generation module 225, as described above with respect to the example SDT system 200 of FIG. 2. The memory(ies) 425 may additionally or alternatively include the topology database 305, and modules such as the flow translator 310, TE module 315, quality monitor 320 and/or network monitor 325, as described above with respect to the example SDN controller 300 of FIG. 3. The memory(ies) 425 may include other software instructions, such as for implementing an operating system and other applications/functions. In some examples, one or more data sets and/or module(s) may be provided by an external memory (e.g., an external drive in wired or wireless communication with the processing system 400) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CDROM, or other portable memory storage.

There may be a bus 430 providing communication among components of the processing system 400, including the processing device(s) 405, I/O interface(s) 410, network interface(s) 415, storage unit(s) 420 and/or memory(ies) 425. The bus 430 may be any suitable bus architecture including, for example, a memory bus, a peripheral bus or a video bus.

In FIG. 4, the input device(s) 435 (e.g., a keyboard, a mouse, a microphone, a touchscreen, and/or a keypad) and output device(s) 440 (e.g., a display, a speaker and/or a printer) are shown as external to the processing system 400. In other examples, one or more of the input device(s) 435 and/or the output device(s) 440 may be included as a component of the processing system 400.

Figure 5:
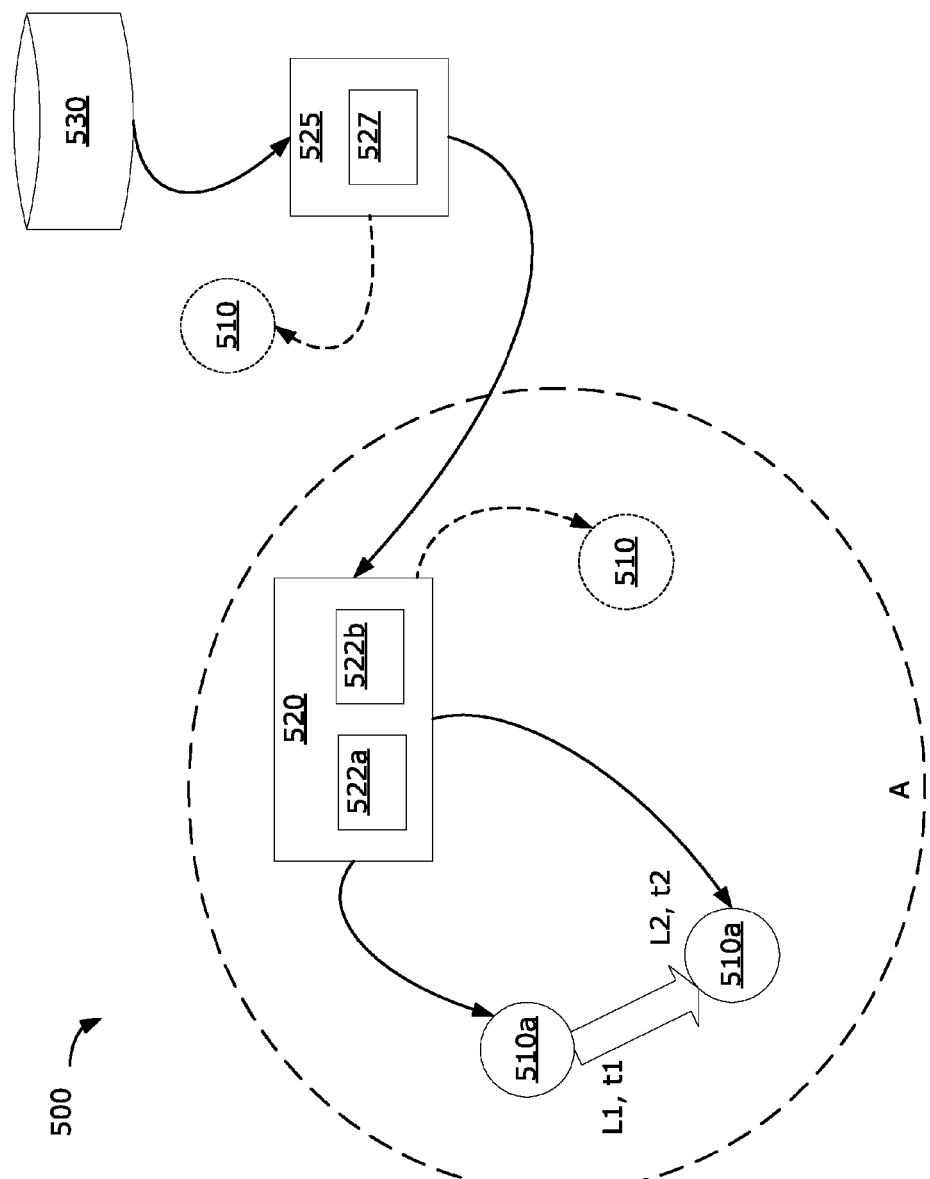
FIG. 5 is a schematic diagram of an example virtual network topology for mobility management.

FIG. 5 is a schematic diagram of an example VN topology suitable for mobility management, which may be implemented using the network architecture 100. In this example, the VN topology 500 is a user-specific topology for a particular UE 510a, and includes one or more virtual serving gateways 520, 525, and one or more data sources 530 (e.g., a network gateway). Communications may include wired communications and/or wireless communications (e.g., from a source 530 to a virtual serving gateway 520, 525, from one virtual serving gateway 525 to another virtual serving gateway 520, and/or from a virtual serving gateway 520 to the UE 510a). Wireless communications may take place over any suitable network (e.g., an intranet, the Internet, a peer-to-peer (P2P) network, a wide area network (WAN), and/or a local area network (LAN)), and may include short-range communications such as Bluetooth communications, near field communications, cellular communications, and/or radiofrequency (RF) communications.

The UE 510a may be any suitable user device. In the present disclosure, the UE 510a may be any mobile communications device, such as a handheld telephone, a cellular telephone, a laptop computer, a smartphone, or any other suitable portable computing device. A user may use the UE 510a to access one or more services and/or content via the VN topology 500, and may use the UE 510a for two-way communications via the VN topology 500.

In the VN topology 500, the UE 510a is associated with a virtual serving gateway 520 by a logical path. Although the UE 510a is shown associated with a single virtual serving gateway 520, the UE 510a may be associated with two or more virtual serving gateways 520, for example where different virtual serving gateways 520 provide different services to the UE 510a. The VN topology 500 defines a logical path directly between the UE 510a and the virtual serving gateway 520, however this direct logical path may be implemented by data transmission via one or more access points and/or routers (not shown). Although the logical path may be considered to be bidirectional (i.e., serving both uplink and downlink traffic), the physical implementation for transmission of uplink data may be different than that for transmission of downlink data. The virtual serving gateway 520 may be physically hosted by one or more physical network nodes (e.g., server(s)) and may migrate to different host(s) as the UE 510a moves. The location of the UE 510a may be tracked by any suitable mobility management technique.

A virtual serving gateway 520, 525 is a logical network node in the VN topology 500. In a per-user VN, the virtual serving gateway 520, 525 is typically a v-u-SGW, which may provide traffic processing functionalities such as serving as an anchor point for data forwarding, providing network access protection, and providing privacy protection, among others. These functionalities may be defined by service customers and/or network operators, for example. A virtual serving gateway 520, 525 may be embodied in a physical host, such as a server, and two or more virtual serving gateways 520, 525 may be embodied in the same physical host. In some examples, a virtual serving gateway 520, 525 may be embodied in two or more physical hosts.

Where a virtual serving gateway 520, 525 is distributed across two or more physical hosts, this may be referred to as the virtual serving gateway 520, 525 being fractionally hosted by each physical host (as opposed to integrally hosted in the case where the virtual serving gateway 520, 525 is hosted by a single physical host). A virtual serving gateway 520, 525 hosted by two or more physical hosts may be represented in the VN topology 500 as a single virtual node. For a single virtual serving gateway 520, 525 hosted by two or more hosts, the VN topology 500 may specify the percentage of the gateway traffic forwarded by each physical host.

Different user-specific VN topologies, with different virtual serving gateways, may be defined for different UEs. The virtual serving gateways for different user-specific VN topologies may share common physical hosts in the physical network. The VN topology 500 may also be defined on a per-service basis, in which case a different VN topology may be defined for different services provided to the same UE 510a. Alternatively, the VN topology 500 may be defined for all services provided to the UE 510a, in which case the UE 510a may be associated with different virtual serving gateways 520 (only one shown in FIG. 5) for providing different service(s).

Generally, a physical host (e.g., server) can host one or more virtual serving gateways that serve one or more UEs 510 in more than one VN topology (as indicated by dashed lines). A physical host may host different fractions of different virtual serving gateways.

Traffic in the VN topology 500 may be controlled using a two-phase approach, namely the source-to-gateway phase and the gateway-to-UE phase. The source-to-gateway phase may be considered to be stable, because the virtual serving gateway 520 acts as a fixed destination for traffic sent from the source 530 to the UE 510a. Data may thus be transmitted along a stable data path from the source 530 to the virtual serving gateway 520 (and in some cases via one or more other virtual serving gateway 525, as discussed further below). The gateway-to-UE phase may be considered to be dynamic, because routing paths from the virtual serving gateway 520 to the UE 510a may change as the UE 510a moves. Data may thus be transmitted along a dynamic data path from the virtual serving gateway 520 to the mobile UE 510a. The dynamic path may be geographically local to the UE 510a and may change in accordance with the UE's 510a movement. The stable path may be geographically distant from the UE 510a and may be insensitive to the UE's 510a mobility. Generally, TE may be performed separately on each phase of the traffic, and may be performed only on one phase or on both phases of the traffic. For example, conventional TE may be performed on the source-to-gateway phase, while TE with fountain coding may be performed on the gateway-to-UE phase.

Although FIG. 5 illustrates downlink traffic, the same or similar VN topology 500 may be used for uplink traffic, and the data source 530 may be alternatively or additionally a data sink. Uplink traffic may similarly involve two phases, namely the UE-to-gateway phase (with a dynamic data path) and the gateway-to-sink phase (with a stable data path), and TE may similarly be performed on both phases of the traffic or only on one phase.

The virtual serving gateway 520 may be placed at physical host(s) that is(are) able to provide service functions and/or content to the UE 510a within a certain geographical area. In the example shown, the virtual serving gateway 520 is placed at physical host(s) serving the geographical area A, which may not be a circular area as depicted.

In this example, the virtual serving gateway 520 is placed at physical host(s) with a consideration of UE mobility. In FIG. 5, the UE 510a is at a first geographic location L1 at an initial time t1. At a later time, the UE 510a has moved to a second geographic location L2 at time t2. The placement of the virtual serving gateway 520 may be determined to accommodate the mobility of the UE 510a to a certain extent (referred to as the mobility insensitivity of the virtual serving gateway 520 and defined further below), by placing the virtual serving gateway 520 at physical host(s) whose service area covers the distance the UE 510a is expected to travel over a given period of time. Thus, the UE 510a remains served by the virtual serving gateway 520 at the same physical host(s) at both locations L1 and L2, such that the logical path between the UE 510a and the virtual serving gateway 520 in the VN topology 500 is unchanged, although the physical data path may have changed (e.g., data communications may be routed through a different set of access points and/or routers). In this way, mobility of the UE 510*a* may be "hidden" from the control plane 120.

The VN topology 500 may include inter-gateway links. For example, the VN topology 500 may include hierarchical links in which a lower level virtual serving gateway 520 has a link with a higher level virtual serving gateway 525. This arrangement may enable service-function chaining, for example. Other topology arrangements may be possible, such as a mesh topology.

Each virtual serving gateway 520, 525 may have access to the contents of respective content caches 522*a*, 522*b*, 527 (e.g., implemented in the memory(ies) of respective server(s) hosting the virtual serving gateways 520, 525). In the example shown, the virtual serving gateway 520 is embodied in two physical hosts (e.g., two servers) and has access to two content caches (522*a*, 522*b* (e.g., each content cache 522*a*, 522*b* being stored in a memory of a different physical host). The content caches 522*a*, 522*b* may store the same, different or overlapping content. The content caches 522*a*, 522*b* may store content that was previously provided to the same UE 510*a* or to another UE 510. By enabling different UEs 510*a*, 510 in different per-user VNs to share content in the content caches 522*a*, 522*b*, the present disclosure may enable more efficient use of network resources and/or reduce network traffic.

Generally, the VN topology 500 may be designed for more efficient and more effective use of shared network resources, and to satisfy a predefined mobility insensitivity parameter. Given a set of physical network nodes that are suitable to be gateway host candidates, the challenge may be how to best select the candidate(s) and place the virtual serving gateway(s) 520, 525 at the host candidate(s).

For example, for a given UE 510*a*, placement of the virtual serving gateway 520 at a physical host that has a shorter path from the source 530 but a longer path from the UE 510*a* may be less sensitive to UE mobility, but may result in less efficient use of network resources due to traffic inflation (e.g., due to use of fountain coding). On the other hand, placement of the virtual serving gateway 520 at a physical host that has a shorter path to the UE 510*a* but a longer path from the source 530 may be more sensitive to UE mobility and may require more frequent relocation of the virtual serving gateway 520 to different host(s), unstable TE decisions, and increased control overhead. Generally, it may be more efficient to have a lesser number of hosts for the virtual serving gateways 520, 525, in order to control operating costs. In some examples, where in-network content caching is available at the physical host(s), it may also be more efficient for a physical host to host many virtual serving gateways for many UEs, in order to increase the potential for content sharing.

In some examples, the present disclosure may enable the use of network coding at virtual serving gateways, to help improve efficiency of the network. In network coding, data packets of one or more flows can be combined and forwarded to other network nodes. An example of network coding is the use of fountain codes (also known as rateless codes), in which data packets of one flow are combined to generate a set of many coded data packets which are then transmitted to the UEs. The UEs may recover the original data from a subset of the coded data packets. This may be useful in situations where data channels for different UEs have different error probabilities (e.g., in broadcast applications), in which cases it may be inefficient for each UE to send requests for missing data packets. The coded data packets may be generated at the data source, however this may result in a significant amount of redundant data packets being transmitted. In some examples of the present disclosure, the coded data packets may be generated at virtual serving gateways instead, which may help to reduce traffic redundancy and/or reduce transmission delay (since the virtual serving gateways are closer to the UEs than the data source). In some examples, the capability of a network node to carry out network coding may be taken into account when determining the suitability of a physical network node to act as a physical host for a virtual serving gateway.

Figure 6:
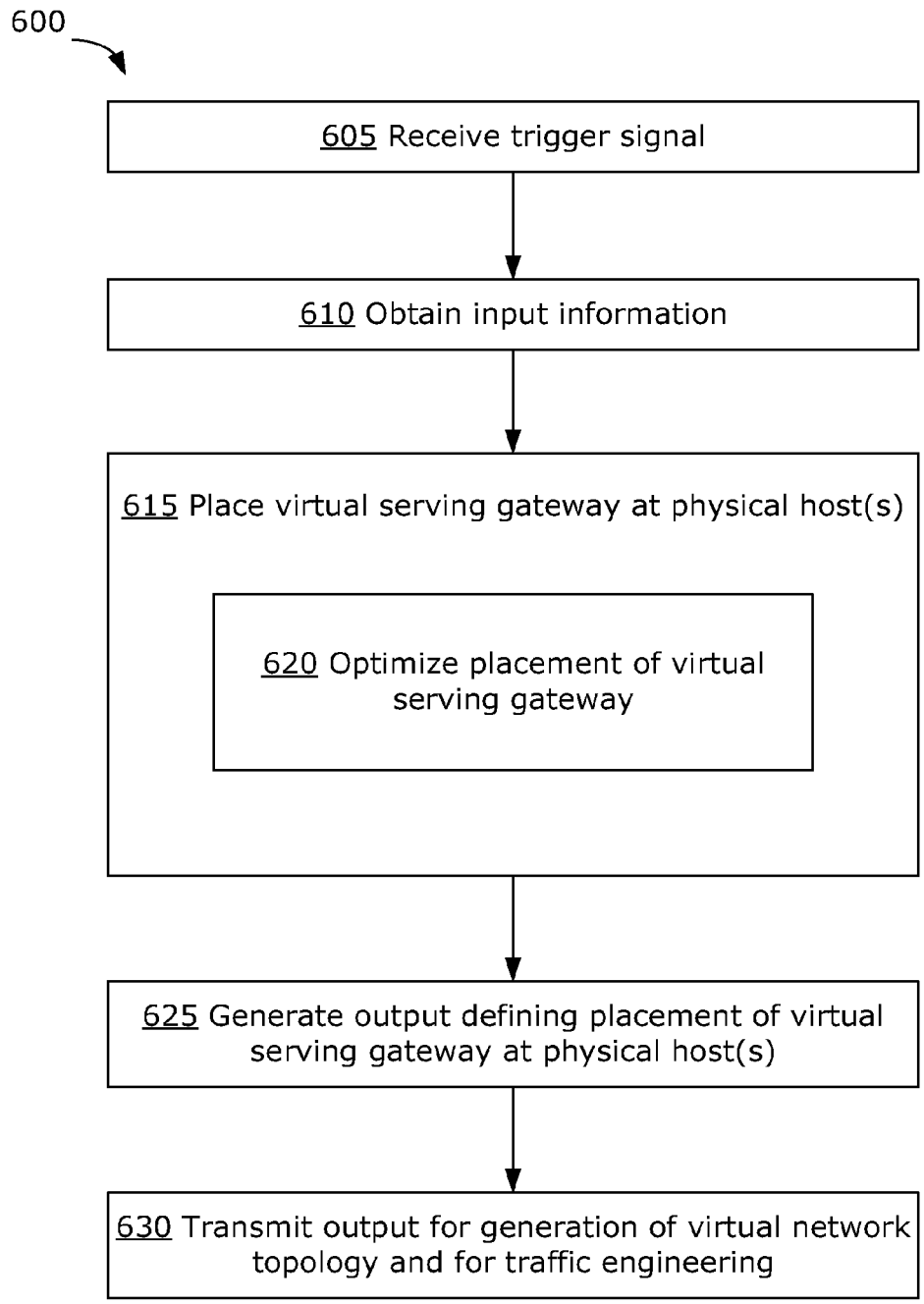
FIG. 6 is a flowchart illustrating an example method for placing virtual serving gateways for mobility management.

FIG. 6 is a flowchart of an example method for placing virtual serving gateways for mobility management. The example method 600 may be implemented by the SDT system 200, using one or more suitable processing systems 400. The example method 600 is described below for placement of a virtual serving gateway for a given UE, however it should be understood that the method 600 may be carried out to place virtual serving gateways for different UEs jointly. The example method 600 may be used to place virtual serving gateways for a per-service VN, as well as for a VN that provides multiple services.

At 605, a trigger signal is received, indicating that new placement of the virtual serving gateway is needed. The trigger may be, for example, a timeout event (e.g., where the SDT system 200 implements a timer to trigger an update of gateway placement at set times, such as every several minutes) and/or may be a signal transmitted to the SDT system 200 from the SDN controller 300. For example, the SDN controller 300 may transmit a signal to the SDT system 200 requesting a new VN topology and new gateway placement:

in the event of QoS and/or QoE falling below a predetermined quality threshold;

in the event of a significant change to the network (e.g., change in traffic beyond a certain threshold, change in content access statistics, addition/removal of gateway candidate(s), change in gateway host capabilities, change in physical connectivity between network nodes including addition/removal of a physical link and/or increase/decrease in the capacity of a physical link);

in the event of gateway host overloading (e.g., due to arrival of a new UE, gateway traffic increasing above a certain threshold, resource usage beyond a certain threshold, change in gateway host capabilities); and/or in the event of network performance degradation (e.g., traffic congestion at a given network node).

Where the trigger signal originates from the SDN controller 300, the trigger signal may be generated by or in response to conditions detected by the traffic engineering module 315, the quality monitor 320 and/or the network monitor 325.

At 610, input information is obtained. The SDT system 200 may determine placement of the virtual serving gateway based on a set of input information including, for example, network information and configuration information.

Network information may include, among others:

UE properties information, such as location, speed/velocity, acceleration, and/or device category (e.g., maximum traffic rate supported);

UE statistics information (which may include spatial and/or temporal statistics), such as data rate (e.g., for downlink/uplink communications, peak rate, mean rate, rate variance), traffic sources (e.g., Internet web addresses), traffic content (e.g., as identified using a hash code based on content attributes or content labels), and/or content access (e.g., frequency and volume);

physical network topology information (which may include statistical and/or instantaneous information), such as identification of physical nodes, node properties (e.g., location, available/maximum storage space, available functions), identification of physical links, link properties (e.g., available/maximum capacity, buffer size), identification of physical connections of traffic sources to the network, and/or connection properties (e.g. throughput, delay); and/or control plane information, such as identification of connectivity between pairs of data plane hardware, and associated properties (e.g., statistical throughput, operational cost, delay), identification of gateway host candidates, and/or gateway host candidate properties (e.g., upper/lower traffic load bounds, maximum/minimum UE count limits, traffic processing functions, traffic rate reduction/inflation factor, content indexing of cache contents).

Configuration information may include, among others:

desired mobility insensitivity;

definition of gateway-to-host association cost measure, such as statistical cost (e.g., delay as cost, delay-jitter as cost, throughput as cost) and other cost measures (e.g., hop count, physical distance, operation cost);

information about network scope (e.g., geographic area of interest, services of interest);

customer/service information (e.g., customer/service identifier, service requirements such as service-function chaining requirements), which may be specified by the customer, service provider and/or VN provider as part of service requirements; and/or definition of weight factors for content caching and/or content sharing considerations.

The present disclosure may use the terms network information and configuration information generally to refer to the input information used to determine placement of gateways and to generate a VN topology. However, it should be understood that these are not strict categorical definitions and other types of input information may be included. For example, some of the input information may also be referred to as customer information or service information.

This input information may be obtained from databases internal to the SDT system 200 (e.g., the network information database 205 and/or configuration information database 210), databases external to the SDT system 200, the SDN controller 300 and/or an operator. In some examples, such as where the trigger signal is received from the SDN controller 300, at least a portion of the input information may be included with the trigger signal at 605. For example, the SDN controller 300 may transmit updated input information such as new configuration information (e.g., reduce/increase mobility insensitivity and/or reduce/increase content sharing consideration) to the SDT system 200, and this update may serve as the trigger signal.

At 615, the placement of the virtual serving gateway at one or more physical hosts is determined. An optimization process, such as the example process described below, may be used to determine the placement of virtual serving gateway(s) at physical host(s).

A set of gateway host candidates may be considered for placing the virtual serving gateway(s). A gateway host candidate may be any physical network node (e.g., a server) available in the physical network for hosting a virtual serving gateway. Not all network nodes may be suitable for hosting a virtual serving gateway (e.g., having insufficient memory or traffic handling resources). In an extreme case, all network nodes in the network may be candidates. In the other extreme, there may be only one host candidate in the network. The gateway host candidates and their properties (e.g., including the current resource usage) may be provided in the network information obtained at 610.

Placement of the virtual serving gateway at physical host(s) may be performed based on a consideration of the functions and/or resources that the virtual serving gateway is to provide to the UE (e.g., as defined in the network information), as well any constraints (e.g., mobility insensitivity) defined in the configuration information. For example, where network coding functionality is available at one or more physical hosts, the virtual serving gateway may be preferentially placed at physical host(s) having network coding and/or video transcoding functionality.

Placing the virtual serving gateway at physical host(s) may include optimizing placement of the virtual serving gateway at 620. Optimization of virtual serving gateway placement may include optimizing placement for content sharing potential. This may be carried out where the input information includes information about the content cached at the host candidates and information about content access by the UE. Optimization for content sharing potential may be carried out jointly with optimization for other objectives, such as minimization of operational cost and/or minimization of network resource utilization.

The virtual serving gateway may be distributively placed across two or more physical hosts. In such a situation, each physical host may host a fraction of the virtual serving gateway and may serve a corresponding fraction of the gateway traffic. For example, consider a virtual serving gateway being fractionally hosted by physical host A and physical host B, with host A hosting 70% of the virtual serving gateway and host B hosting 30%. Host A may correspondingly serve 70% of the gateway traffic and Host B may correspondingly serve 30% of the gateway traffic. Where a virtual serving gateway is hosted by a single physical host, it may be considered that the physical host is hosting 100% of the virtual serving gateway and serving 100% of the gateway traffic.

In examples where there is freedom to define the functionality(ies) provided by virtual serving gateway(s), the method 600 may include determining one or more functionalities (e.g., fountain coding and/or video transcoding) that should be provided by one or more virtual serving gateways at one or more physical hosts, such as according to service requirements set forth in the network information.

At 625, a set of output information defining placement of the virtual serving gateway at one or more physical hosts is generated. The set of output information defining virtual serving gateway placement may include, for example, information associating a UE identifier with a gateway-host identifier, hosting percentage, and a service identifier. Where the virtual serving gateway is being placed for a per-service VN (i.e., only one service is being provided) the service identifier may be omitted from the output information.

In some examples, where the method 600 also defines functionality(ies) provided by virtual serving gateway(s) at physical host(s), information defining the functionality(ies) to be provided at the physical host(s) may also be outputted. For example, this information may be included with the set of the output information at 625, or in a second set of output information. This information may be transmitted to an external system, for example to the SDP system 128.

In some situations, one or more gateway host candidates may not host any virtual serving gateway, in which case those gateway host candidates will not be used in the VN topology.

At 630, the output information may be transmitted for generation of the VN topology and for TE. For example, the output information may be transmitted to the topology generation module 225 of the SDT system 200, and may also be transmitted to the SDN controller 300.

In some examples, the output information may be used by the flow translator 310 of the SDN controller 300 to generate flow segments on which TE is carried out. In the case where a virtual serving gateway is fractionally hosted across two or more physical hosts, the traffic flow for that virtual serving gateway may be translated into fractional flow segments corresponding to fractional hosting of the virtual serving gateway by each host. In this case, high-level flow splitting may take place before performing TE, which may provide fine-grained flow splitting for each fractional flow furthermore.

The example method 600 may be performed by the SDT system 200 in conjunction with TE by the SDN controller 300, to implement a closed-loop feedback control between the SDT system 200 and the SDN controller 300. The VN topology may be thus responsive and adaptive to changes in network traffic and/or physical network topology. Placement of virtual serving gateways may be performed in consideration of UE mobility, and may be optimized to enable even short-term efficiencies (e.g., content sharing among UEs travelling on the same bus).

Example Optimization Process

An example optimization process that may be used to determine placement of virtual serving gateways at physical hosts is now described. The example process may be implemented by the SDT system 200 (e.g., at the gateway placement module 215).

In this example, the following denotations will be used:

U: set of UEs

W: set of gateway host candidates for virtual serving gateways $GW(u)$: the virtual serving gateway assigned to u, $\forall u \in U$ $\epsilon$: minimum placement fraction at w, $\forall w \in W$ $\delta$: traffic rate inflation factor at w, $\forall w \in W$ $\omega$: minimum sensitivity of w to UE mobility, $\forall w \in W$ $\tau$: maximum sensitivity of w to UE mobility, $\forall w \in W$ $r^+_w$: incoming rate upper bound of w, $\forall w \in W$ $k_w$: virtual serving gateway count upper bound of w, $\forall w \in W$ $r_u$: rate of u, $\forall u \in U$ (e.g., statistical rate or device maximum rate)

$c_{uw}$: placement cost of $GW(u)$ at w, $\forall u \in U$, $\forall w \in W$ (e.g., hop count)

$s_{uw}$: mobility sensitivity of $GW(u)$ at w, $\forall u \in U$, $\forall w \in W$ $p_{uw}$: placement preference of $GW(u)$ at w, $\forall u \in U$, $\forall w \in W$ $a_{uw}$: placement fraction of $GW(u)$ at w, $\forall u \in U$, $\forall w \in W$ $x_{uw}$: binary indicator of w hosting $GW(u)$, $\forall u \in U$, $\forall w \in W$ $b_w$: selection indicator of w, $\forall w \in W$ In the following discussion, the network is modeled with a set of UEs U connected to the network G through single-hop connectivity. G includes the set of physical network nodes N and the edge or link set E. A pre-defined traffic source s, $s \in N$ performs downlink communication with each u, $u \in U$. For example, s may be an ingress router. A subset W of N are network nodes pre-configured to be virtual serving gateway host candidates. For example, network nodes that are suitable gateway host candidates may be pre-configured to have larger bandwidth, higher data processing power and/or larger storage space, which may enable the gateway host candidates to accommodate greater traffic, engage in mobility management and/or engage in network coding. W may be equal to N in some cases. In some examples, s may be included in W.

$GW(u)$ denotes the virtual serving gateway of a given UE u. The two-phase traffic control mechanism, as discussed above, may be engaged such that the downlink traffic for u is directed from s to $GW(u)$ and then from $GW(u)$ to u. In some cases, the placement of $GW(u)$ may be performed in an integral manner, meaning that a given $GW(u)$ is hosted by a single node w, $w \in W$ rather than being fractionally distributed across two or more nodes. The cost of the placement of $GW(u)$ at a host candidate w is denoted as $c_{uw}$, which may reflect any type of cost such as operational cost, control cost, or combinations thereof, depending on the cost measure used (e.g., as defined in the configuration information provided as input for gateway placement).

In some examples, $GW(u)$ may be distributively placed at multiple hosts, each serving a fraction of traffic passing through $GW(u)$ (this may also be referred to as a host hosting a fraction of the virtual serving gateway or the virtual serving gateway being fractionally hosted by each of the multiple hosts). The placement fraction for a given host represents the placement cost fraction and indicates the fraction of the downlink traffic for u that is served through the given host, statistically. For example, if w hosts 30% of $GW(u)$ and w' hosts 70% of $GW(u)$, then the respective placement costs will be $0.3c_{uw}$ and $0.7c_{uw'}$; and 30% of the downlink traffic for u will be delivered to w and 70% of the downlink traffic for u will be delivered to w'. This approach may also include the case where $GW(u)$ is placed at a single host w, by specifying that w hosts 100% of $GW(u)$.

In this example, each host candidate w is able to implement a network coding function (e.g., implementation of fountain coding) for gateway-to-UE communication and/or a transcoding function for gateway-to-UE video data transmission. As a consequence, rate inflation (in the case of fountain coding) or reduction (in the case of video transcoding) occurs at the gateway host by a factor of $\delta \geq 1$. In the case of $\delta = 1$, neither transcoding nor network coding is carried out, or there is no net rate inflation/reduction effect. In the case of $\delta = 0$, the gateway host performs no gateway-to-UE communication and serves only to absorb traffic. Each host candidate w has a rate upper bound $r_w^-$ for outgoing traffic, which may be determined from historical performance, for example. Dividing this upper bound by the rate inflation factor $\delta$, the upper bound of incoming rate of w may be obtained as:

$$r_w^+ = \frac{1}{\delta} r_w^-.$$

It should be noted that $r_w^+$ is naturally bounded above by the minimum of total capacity of incoming links incidental to w and that of outgoing links. Each w also has a virtual serving gateway count upper bound $k_w$, limiting the number of virtual serving gateways (whether hosted fractionally or integrally) it can host. These properties of each host candidate may be specified in the network information provided as input for gateway placement.

A discussion of what is meant by mobility insensitivity is now provided. First, consider an arbitrary routing path from source s to a UE u. The path may be determined according to certain criteria. It may be assumed that the path length is proportional to the physical distance between s and u. Generally, this is a valid assumption when hop count is used or considered as part of the routing criteria. Although this assumption may not hold in certain specific cases or setups, since the example optimization described here deals with statistical information and describes a general solution, this assumption is acceptable. When u moves, the path may change, and the change may occur in a segment of the path adjacent to u. If u has a high mobility, the changed segment may be a large portion of the path; if u has a low mobility, the changed segment may be a small portion of the path. A virtual serving gateway may be placed in the path as an anchor, which is considered to be insensitive to (i.e., unchanged by) mobility of u if the routing path changes only in the portion downstream of the anchor. In this way, the anchor may serve to "hide" the motion of u from s. Thus, the virtual serving gateway should be placed in such a way as to be insensitive to the mobility of the respective UE.

Figure 7:
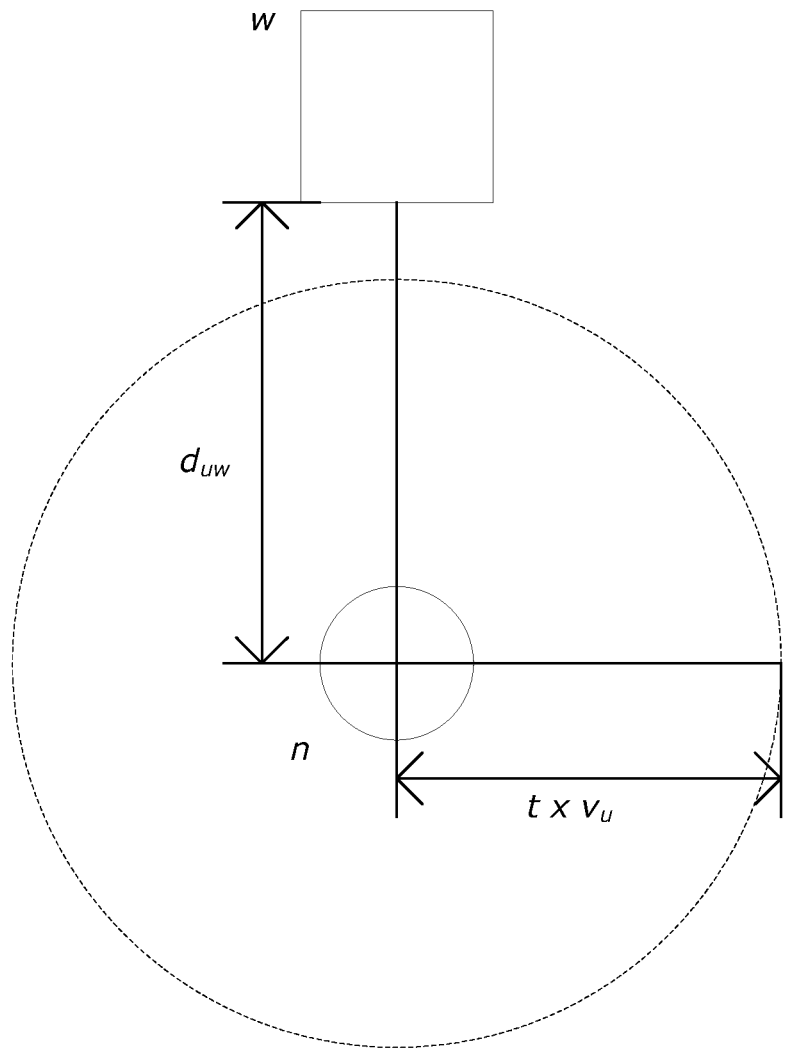
FIG. 7 is a diagram illustrating an example determination of mobility sensitivity.

The quantification of mobility insensitivity may be understood with reference to the model illustrated in FIG. 7. In this model, the UE u is moving at a constant speed $v_u$. Let $d_{uw}$ denote the distance between a gateway host candidate w and u's current location. Given a time period t, the maximum distance that u may move away from its current location is $t \times v_u$. In FIG. 7, the dashed circle encloses all possible positions of u in t. During time period t, the mobility sensitivity of GW(u) at a physical host w may be represented as:

$$s_{uw} = \left\lceil \frac{t \times v_u}{d_{uw}} \times \exp \right\rceil$$

where exp is a scaling factor for precision tuning. Precision tuning may be carried out because precision is lost in the ceiling operation. Using the exp scaling factor, precision loss may be controlled to some extent. The exp scaling factor may be fixed (e.g., as an input parameter) or may be dynamically determined (e.g., determined on-the-fly by the SDT system 200). In the dynamic case, exp may be calculated to be equal to or have the same magnitude as the median or mean of $d_{uw}/(t \times u_v)$ values of all (UE, physical host) pairs, for example. From the above equation, it can be seen that the larger the value of $s_{nw}$, the greater the mobility sensitivity of GW(u).

A discussion of content sharing is now provided. To take into consideration the potential for content sharing, consider the example where there is a universal content attribute set. Each piece of content may be associated with a subset of attributes. For example, if the content comprises a song, the content may be associated with one or more attributes such as the URL (i.e., the source address), identification of the artist, identification of the album, identification of the release date, and/or any other suitable attribute. Different types of content (e.g., text, image, video or audio content) may be identified using different sets of attributes. A piece of content may be uniquely identified using its attributes, for example using a hash tag generated from the attributes.

Consider the example where each gateway host candidate w performs content caching and maintains a local content cache set $C_w$. Each UE u is associated with certain content access statistics, described by a content set $C_u$ in which each element i is associated with an access probability $\rho_i$. The content set may be correlated in time and/or geography. The statistics information may be collected by the network using any suitable mechanism, or may be learned from the UE's historical behavior (e.g., in the case where the UE tracks the UE's behavior). The content accessed by UE u, correlated with time t and location l, is denoted by $C_u^{t,l}$.

When in-network caching is enabled at gateway host candidates, placement of virtual serving gateways should be optimized to minimize placement un-preference, that is, to maximize the potential that each UE shares the content cache(s) at the host(s) of its associated virtual serving gateway in subsequent data sessions. Given time t, the placement preference factor $p_{uw}$ for each pair of UE and gateway host candidate (u, w) may be represented as:

$$p_{uw} = \frac{\sum_{i \in C_u^{t,L(u)} \cap C_w} \rho_i}{|C_u^{t,L(u)} \cap C_w|}$$

where L(u) is the set of locations closest to u and $C_u^{t,L(u)}$ is the union of respective content access sets.

In the example optimization problem discussed here, there are three optimization objectives when placing a virtual serving gateway at a gateway host candidate. One objective is to minimize the average placement cost from a network resource utilization viewpoint, which may be referred to as the placement cost minimization (PCM) objective. Another objective is to minimize the number of gateway hosts used from an operational cost perspective, which may be referred to as the host selection minimization (HSM) objective. Another objective is to minimize placement un-preference between UEs and respective gateway hosts such as to maximize the content sharing potentials, which may be referred to as the placement un-preference minimization (PUM) objective. Thus, this example PCM-HSM-PUM joint optimization problem may be considered to be a content-aware gateway placement problem.

The variable $a_{uw}$ is used to represent the fraction of GW(u) placed at host w. The binary variable $x_{uw}$ denotes whether w is hosting a fraction of GW(u), and the binary variable $b_w$ denotes whether w is hosting any fraction of any virtual serving gateway. The average placement cost for placing a virtual serving gateway at a host may be represented as:

$$C(a) = \frac{1}{|U|} \sum_{w \in W} \sum_{u \in U} a_{uw} c_{uw}$$

the total number of hosts selected may be represented as:

$$Z(b) = \sum_{w \in W} b_w$$

and the total placement un-preference may be represented as:

$$R(x) = \sum_{w \in W} \sum_{u \in U} x_{uw}(1 - p_{uw})$$

With $a_{uw}$, $b_w$ and $x_{uw}$ being decision variables, the example multi-objective optimization problem to achieve PCM, HSM and PUM jointly may be formulated. The joint optimization may be performed using linear scalarization, where $\alpha$, $\beta$, $\gamma \in [0,1]$ are the objective weighting factors such that $\alpha + \beta + \gamma = 1$.

Because the PCM, HSM and PUM objective values may each be at a different scale, a scaling factor, when necessary, should be applied to each of these objectives to convert their values to the same scale and therefore facilitate the selection of α, β, γ values. In the following example optimization problem formation, it is assumed that the scaling factor is not necessary.

The following is the mathematical representation of the example multi-objective optimization problem:

$$\min_{a,b,x,v} \alpha C(a) + \beta Z(b) + \gamma R(x) + Mv$$

such that $$\sum_{w \in W} a_{uw} = 1, \forall u \in U \quad (1)$$

$$a_{uw} \le x_{uw}, \forall u \in U, \forall w \in W \quad (2)$$

$$x_{uw} \in \{0, 1\}, \forall u \in U, \forall w \in W \quad (3)$$

$$x_{uw} \le b_w, \forall u \in U, \forall w \in U \quad (4)$$

$$\varepsilon - a_{uw} x_{uw} \le 0, \forall u \in U, \forall w \in W \quad (5)$$

$$w - x_{uw} s_{uw} \le v^w, \forall u \in U, \forall w \in W \quad (6)$$

$$x_{uw} s_{uw} - \tau \le v^\tau, \forall u \in U, \forall w \in W \quad (7)$$

$$\sum_{u \in U} a_{uw} r_u - r_w^+ \le v^r, \forall w \in W \quad (8)$$

$$\sum_{u \in U} x_{uw} - k_w \le v^k, \forall w \in W \quad (9)$$

$$v^w, v^\tau, v^r, v^k \ge 0 \quad (10)$$

In this example, $v=[v^w, v^\tau, v^r, v^k]$ is defined as the violation vector which includes auxiliary variables representing the maximum violations of virtual serving gateway minimum mobility sensitivity, virtual serving gateway maximum mobility sensitivity, incoming traffic rate, and gateway count upper bound of the host candidate, respectively. The last term in the optimization problem is a penalization term, where M is a violation penalty matrix and can be set up to penalize different violations differently. Generally, the entries in M should be very large positive values, compared to the possible profits that can be obtained in the three minimization objectives.

Constraint (1) above ensures that each virtual serving gateway is fully hosted. When solving the optimization problem, constraints (2) and (3) together ensure that the binary variable $x_{uw}$ equals to 1 if and only if w hosts GW(u) at solution. Constraint (4) ensures that $b_w$ at solution equals to 1 if w is hosting a virtual serving gateway and 0 otherwise. Constraint (5) ensures that no placement fraction is smaller than an allowed minimum fraction, which means that a virtual serving gateway can be distributively placed at a maximum number of physical hosts and avoids placement fractions that are too small. Constraints (6) to (9) calculate the maximum per host violations. If there are no violations, v will be a zero vector according to constraint (10). Since each violation is amplified by the very large penalty factor in M, this example optimization problem favors a solution that generates zero or minimal violations at the gateway host(s). These constraints may be considered to be soft constraints (since violations are permissible). The use of soft constraints rather than hard constraints may enable feasibility and ensure arrival at an optimal or near-optimal solution.

This example optimization problem is a non-deterministic polynomial-time (NP)-hard mix integer programming problem, where $x_{uw}$, $\forall u \in U$, $\forall w \in W$ are the only (binary) integer decision variables. An example two-step approach to solving this problem is now described. In the first step, the problem is relaxed to a linear programming problem and the relaxed problem is solved to obtain a fractional solution. In the second step, the fractional solution is rounded in an iterative way as follows. First, identify all the UEs with only an integral $x_{uw}$ decision and fix their associated decision values, and sort the remainder set U' of UEs (i.e., the set of UEs with a fractional $x_{uw}$ decision). The set U' is sorted by descending order of $\max_{w \in W: x_{uw} < 1} x_{uw}$, $\forall u \in U'$ and processed in this order. For processing a UE u, all the decision variables related to $\forall u' \in U'$, $u' \ne u$ are treated as constant variable and the PCM-HSM-PUM optimization problem is solved. The decisions are then taken as the final decision for u. In this example two-step approach, each problem is a linear problem that may be solved using a suitable linear programming solver such as the GNU linear programming kit (GLPK).

In some examples, the optimization problem may not consider content sharing, in which case the optimization problem may be simplified by omitting the R(x) objective from the minimization problem set forth above (i.e., by setting γ=0).

The present disclosure may enable more efficient TE by taking into consideration the potential for content sharing between gateway hosts. For example, the present disclosure may take into account UE content access statistics in time and/or location (e.g., statistical information about traffic sources accessed by the UE when the UE is near a given geographical location in a given time period, each source being weighted with a normalized access rate), gateway host content cache (e.g., using content indexing, such as each content source being weighted with a normalized cache volume), and/or content sharing potential (e.g., defined as the ratio of the weight of set intersection to the weight or size of universal traffic source set).

By considering the use of network coding at virtual serving gateways, the present disclosure may help reduce undesirable traffic redundancy at gateways.

When determining virtual serving gateway placement, it may be possible to selectively base the optimization process either on UE device information (e.g., the maximum traffic rate supported by the device) or UE statistical information (e.g., traffic statistics by time and/or location, such as the average rate when near a given geographical location in a given time period). By selecting which type of UE information to use for optimization, a more conservative or more aggressive optimization may be carried out. For example, a conservative optimization may be carried out based on a worst case scenario (e.g., the traffic rate is at the maximum supported by the device) while a more aggressive optimization may be carried out based on the most likely scenario (e.g., the traffic rate is at the historical average experience by the UE for a given location).

The present disclosure also provides a way to quantify the mobility insensitivity of a gateway host, and to use mobility insensitivity as a parameter for optimization.

The present disclosure provides certain example algorithms and calculations for implementing examples of the disclosed methods and systems. However, the present disclosure is not bound by any particular algorithm or calculation.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

In some examples, the present disclosure provides a non-transitory computer readable medium having tangibly stored thereon computer executable instructions that, when executed by a processing device of a processing system, may cause the system to: obtain a set of input information, the input information including: network information providing information about a physical network for mobile communications by a mobile device; and configuration information providing one or more parameters for placing a virtual serving gateway, including a mobility insensitivity criteria. The instructions may further cause the system to: determine placement of the virtual serving gateway at one or more physical hosts in the physical network in accordance with the network information and the configuration information, the virtual serving gateway being distributively placeable across one or more physical hosts; and generate a set of output information. The output information may include: information identifying placement of the virtual serving gateway at the one or more physical hosts; and a respective hosting percentage for each physical host.

In some examples, the network information may include information representing cached content stored at each physical host and information representing content access by the mobile device, and placement of the virtual serving gateway may be determined based on a determination of the potential of the mobile device to access the cached content.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for placing a virtual serving gateway for serving a mobile device in a physical network, the method comprising:
    generating a set of output information indicating placement of the virtual serving gateway over two or more physical hosts selected from two or more host candidates in accordance with one or more parameters for evaluating the two or more host candidates;
    wherein traffic to the virtual serving gateway is split among the two or more physical hosts.

2. The method of claim 1 wherein the one or more parameters include information representing cached content stored at each host candidate and information representing content access by the mobile device, wherein evaluation of the two or more host candidates includes a determination of the potential of the mobile device to access the cached content.

3. The method of claim 1 wherein a multi-objective joint optimization process is used to select the two or more physical hosts from the two or more host candidates.

4. The method of claim 3 wherein the multi-objective joint optimization process solves a joint optimization problem of minimizing network resource utilization, minimizing operational cost, and maximizing content sharing potential.

5. The method of claim 3 wherein at least one mobility insensitivity criterion is used as a constraint in the multi-objective joint optimization process.

6. The method of claim 1, further comprising:
    receiving a trigger signal indicating a request for generation of a new virtual network topology, and performing the obtaining and generating in response to receipt of the trigger signal.

7. The method of claim 6 wherein the trigger signal is received from a software-defined networking controller, and the trigger signal comprises an update to the one or more parameters.

8. The method of claim 1, further comprising transmitting the set of output information to a software-defined networking controller.

9. The method of claim 1, wherein the one or more parameters include a requirement for one or more functionalities to be provided by the virtual serving gateway, the method further comprising:
    generating a second set of output information defining the one or more functionalities to be provided by the two or more physical hosts; and
    transmitting the second set of output information to a software-defined protocol system.

10. The method of claim 1, wherein the one or more parameters comprise at least one mobility insensitivity criterion.

11. The method of claim 10 wherein mobility sensitivity of a host candidate is quantified based on a moving speed of the mobile device and a physical distance between the host candidate and the mobile device, and the at least one mobility insensitivity criterion specifies a maximum or minimum threshold for the mobility sensitivity.

12. The method of claim 1, wherein the physical network is a radio access network (RAN).

13. The method of claim 1, wherein the mobile device is served by a plurality of virtual serving gateways.

14. The method of claim 1, wherein the virtual serving gateway is part of a hierarchical topology having two or more levels of virtual serving gateways.

15. A system for placing a virtual serving gateway for serving a mobile device in a physical network, the system comprising a processing device configured to cause the system to:
  generate a set of output information indicating placement of the virtual serving gateway over two or more physical hosts selected from two or more host candidates in accordance with one or more parameters for evaluating the two or more host candidates;
  wherein traffic to the virtual serving gateway is split among the two or more physical hosts.

16. The system of claim 15 wherein the one or more parameters include information representing cached content stored at each hostcandidate and information representing content access by the mobile device, evaluation of the two or more host candidates includes a determination of the potential of the mobile device to access the cached content.

17. The system of claim 15 wherein a multi-objective joint optimization process is used to select the two or more physical hosts from the two or more host candidates.

18. The system of claim 17 wherein the multi-objective joint optimization process solves a joint optimization problem of minimizing network resource utilization, minimizing operational cost, and maximizing content sharing potential.

19. The system of claim 17 wherein at least one mobility insensitivity criterion is used as a constraint in the multi-objective joint optimization process.

20. The system of claim 15, wherein the processing device is further configured to cause the system to:
  receive a trigger signal indicating a request for generation of a new virtual network topology, and perform the obtaining and generating in response to receipt of the trigger signal.

21. The system of claim 20 wherein the trigger signal is received from a software-defined networking controller, and the trigger signal comprises an update to the one or more parameters.

22. The system of claim 15, wherein the processing device is further configured to cause the system to transmit the set of output information to a software-defined networking controller.

23. The system of claim 15, wherein the one or more parameters include a requirement for one or more functionalities to be provided by the virtual serving gateway, wherein the processing device is further configured to cause the system to:
  generate a second set of output information defining the one or more functionalities to be provided by the two or more physical hosts; and
  transmit the second set of output information to a software-defined protocol system.

24. The system of claim 15, wherein the one or more parameters comprise at least one mobility insensitivity criterion.

25. The system of claim 24 wherein mobility sensitivity of a host candidate is quantified based on a moving speed of the mobile device and a physical distance between the host candidate and the mobile device, and the at least one mobility insensitivity criterion specifies a maximum or minimum threshold for the mobility sensitivity.

26. The system of claim 15, wherein the physical network is a radio access network (RAN).

27. The system of claim 15, wherein the mobile device is served by a plurality of virtual serving gateways.

28. The system of claim 15, wherein the virtual serving gateway is part of a hierarchical topology having two or more levels of virtual serving gateways.

* * * * *